(12) United States Patent
Breau et al.

(10) Patent No.: US 8,213,423 B1
(45) Date of Patent: Jul. 3, 2012

(54) UNIQUE SESSION ID SHARING

(75) Inventors: Jeremy Breau, Kansas City, MO (US);
John E. Belser, Olathe, KS (US);
Raymond Doerr, Gardner, KS (US);
Gary Rieschick, Louisburg, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1105 days.

(21) Appl. No.: 12/108,989

(22) Filed: Apr. 24, 2008

(51) Int. Cl.
*H04L 12/28* (2006.01)
*H04L 12/56* (2006.01)

(52) U.S. Cl. .......... 370/389; 455/410

(58) Field of Classification Search .......... None
See application file for complete search history.

(56) References Cited

U.S. PATENT DOCUMENTS

| | | | |
|---|---|---|---|
| 2002/0078346 A1* | 6/2002 | Sandhu et al. | 713/156 |
| 2005/0003798 A1* | 1/2005 | Jones et al. | 455/410 |
| 2006/0073840 A1* | 4/2006 | Akgun et al. | 455/456.3 |
| 2009/0225655 A1* | 9/2009 | Ray et al. | 370/231 |

OTHER PUBLICATIONS (No Author Listed) Cisco IOS Software Releases 12.2 T, "Mobile IP—Home Agent Accounting," 16 pp., (No Publication Date Listed) http://www.cisco.com/en/US/docs/ios/12_2t/12_2t15/feature/guide/fthaacct.html.

Cristian Morariu, Martin Waldburger & Burkhard Stiller, University of Zurich, Department of Informatics, "An Accounting and Charging Architecture for Mobile Grids," Apr. 2006, Zurich, Switzerland, 10 pp.

* cited by examiner

*Primary Examiner* — Chirag Shah
*Assistant Examiner* — Minh-Trang Nguyen (57) ABSTRACT

A method, system, and medium are provided for accounting for data transfer across a packet-switched network. A unique session identifier is generated at an accounting service node and provided to accounting nodes. Accounting nodes collect data transfer information corresponding to a session and associate the data transfer information with the unique session identifier. The data transfer information is provided to the accounting service node, which generates accounting records based on that information.

20 Claims, 5 Drawing Sheets

UNIQUE SESSION ID SHARING

SUMMARY

The present invention is defined by the claims below. Embodiments of the present invention provide a system and a computer-implemented method for, among other things, accurate accounting of data transfer in a packet-switched network.

In a first illustrative aspect, a set of computer-useable instructions provide a method of accounting for data transfer across a packet-switched network. One embodiment of the method includes initiating a data session for a user on a network having accounting nodes. A unique session identifier (USI) associated with the data session is generated and provided to the accounting nodes. Using data transfer information associated with the USI and reported by the accounting nodes, an accounting record is generated.

In another illustrative aspect, a set of computer-useable instructions provide another method of accounting for data transfer across a packet-switched network. One embodiment of the method includes receiving a request to grant a mobile node access to network resources. The embodiment further includes communicating an access request to an Authentication, Authorization, and Accounting (AAA) server and receiving authorization from the AAA server to grant the mobile node access to network resources. The authorization received from the AAA server also includes a USI. The embodiment additionally includes collecting data transfer information associated with communications between the mobile node and the network and associating the collected data transfer information with the USI. The data transfer information is then provided to the AAA server for accounting.

In a third illustrative aspect, a set of computer-useable instructions provide another method of accounting for data transfer across a packet-switched network. One embodiment of the method includes receiving a request to authorize a first accounting node to grant a user access to network resources. A USI associated with the session is generated and stored in a database. The embodiment also includes authorizing the first accounting node to grant the user access and providing the USI to the first accounting node. The embodiment further includes receiving a similar request for authorization from additional accounting nodes, and in response, granting authorization and providing the USI to the additional accounting nodes. Data transfer information is received from the first and additional accounting nodes and is used to generate an accounting record corresponding to the session.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the present invention provide systems and methods for accounting for data transfer across a packet-switched network by using a single unique session identifier (USI) generated at an accounting node to correlate data transfer information.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| AA | Access Request |
| AAA | Authentication, Authorization, and Accounting |
| AR | Access Accept |
| CDMA | Code Division Multiple Access |
| CD-ROM | Compact Disk Read Only Memory |
| DTI | Data Transfer Information |
| DVD | Digital Versatile Discs |
| EDGE | Enhanced Data rates for GSM Evolution |
| EEPROM | Electrically Erasable Programmable Read Only Memory |
| EV-DO | Evolution-Data Optimized |
| GGSN | GPRS Gateway Support Node |
| GSM | Global System for Mobile Communications |
| GPRS | General Packet Radio Service |
| IMS | IP Multimedia Subsystem |
| LAN | Local Access Network |
| MN | Mobile Node |
| NAI | Network Access Identifier |
| PDA | Personal Digital Assistant |
| PDSN | Packet Data Serving Node |
| RAM | Random Access Memory |
| ROM | Read Only Memory |
| RRP | Registration Reply |
| RRQ | Registration Request |
| TDMA | Time Division Multiple Access |
| UMTS | Universal Mobile Telecommunications System |
| USI | Unique Session Identifier |
| WiMAX | Worldwide Interoperability for Microwave Access |

Further, various technical terms are used throughout this description. An illustrative resource that fleshes out various aspects of these terms can be found in *Newton's Telecom Dictionary* by H. Newton, $22^{nd}$ Edition (2006).

Embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a server, a router, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
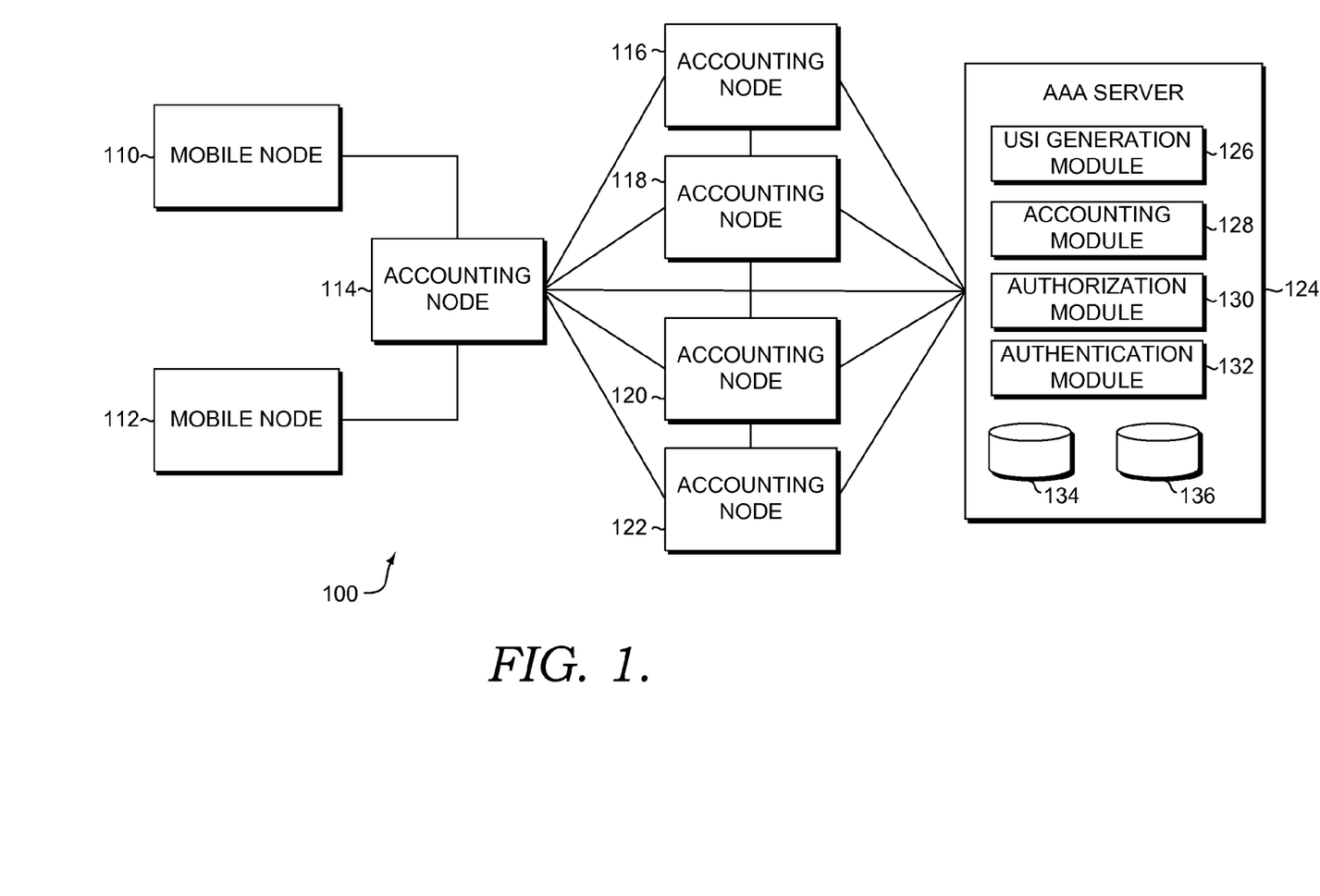
FIG. 1 is a block diagram showing an exemplary accounting network environment suitable for implementing an embodiment of the present invention.

In FIG. 1, an exemplary packet-switched accounting network environment 100 is shown with mobile nodes 110 and 112, accounting nodes 114, 116, 118, 120, 122, and Authentication, Authorization, and Accounting (AAA) server 124. Accounting network 100 may utilize any number of various technologies and protocols, including but not limited to, IMS, RADIUS, Diameter, and the like. In an embodiment, accounting network 100 may utilize various other communication protocols such as, for example, Internet Protocol (IP). In other embodiments, accounting network 100 may be associated with an access network that provides access to another network, such as an IP network.

Mobile nodes 110 and 112 may be any kind of mobile communication device such as a mobile phone, PDA, Blackberry®, and the like. Mobile nodes 110 and 112 may communicate with network devices using a variety of wireless technologies including, but not limited to, CDMA, EDGE, EV-DO, GPRS, GSM, UMTS, Wi-Fi, WiMAX, and the like. In an embodiment, mobile nodes 110 and 112 may be associated with users that are subscribers to a mobile network corresponding to the exemplary accounting network 100 illustrated in FIG. 1. In another embodiment, one or more users associated with a mobile node 110, 112 may not be a subscriber to a mobile network corresponding to the exemplary accounting network 100. In various embodiments of the present invention, each of mobile nodes 110, 112 may have an associated Network Access Identifier (NAI) that provides a specific user identity. NAI's may be used to authenticate a mobile node 110, 112 on an accounting network 100. Typically, the same NAI is used for each user session associated with a particular mobile node 110, 112.

It will be appreciated by those skilled in the art that accounting network 100 may be one of a plurality of accounting networks associated with a particular mobile network, one of a plurality of independent accounting networks associated with any number of different mobile networks, and further that accounting network 100 may be connected to any number of other accounting networks, mobile networks, IP networks, LANs, the Internet, and the like.

Additionally, it should be understood that the network elements illustrated in FIG. 1 are scalable. That is, there may be any number of mobile nodes, accounting nodes, and AAA servers associated with a particular accounting network. Additionally, there may be other elements not shown in FIG. 1 that provide various functionalities, services, interfaces, and the like. The exemplary accounting network 100 is only one of a myriad of possible configurations, and is illustrated as having a limited number of network elements for simplicity and clarity. We do not intend to limit, by the illustrations and descriptions herein, the functionality, configuration, or other aspect of any network suitable for implementing embodiments of the present invention.

The accounting network 100 shown in FIG. 1 includes an accounting node 114 that communicates with mobile nodes 110 and 112. Accounting node 114, as well as any or all of the other accounting nodes 116, 118, 120, 122 illustrated in FIG. 1 may be implemented as servers, program modules, virtual machines, components of a server or servers, networks, and the like. In one embodiment, for example, each of the accounting nodes 114, 116, 118, 120, 122 may be implemented as a separate server. In another embodiment, each of the accounting nodes 114, 116, 118, 120, 122 may be implemented on a single server or bank of servers. In various embodiments, one or more of accounting nodes 114, 116, 118, 120, 122 are capable of performing deep packet capture and deep packet inspection, and/or other information gathering techniques.

In an embodiment, an accounting node 114, 116, 118, 120, 122 may be capable of identifying recordable data transfer types, and recordable data transfers. As used herein, a recordable data transfer type includes a type of data transfer that is identified within the accounting network 100 as a type of data transfer about which information is collected. In an embodiment, a recordable data transfer type may include, for example, types of data transfer for which users can be charged (i.e., billed), types of data transfer that may be of interest in conducting resource consumption analysis, or other types of data transfer about which information is collected. The type of data transfer may be ascertained in various ways such as, for example, by utilizing deep packet inspection to analyze the contents of headers and/or data payloads within individual packets. As used herein, a recordable data transfer may include any transfer of data, where the type of data transfer is a recordable data transfer type.

In an embodiment of the present invention, accounting node 114 may include a network access server such as, for example, a PDSN or a GGSN. In other embodiments, accounting node 114 may include a foreign network to the accounting network 100, a AAA server associated with a different network or with the same network, or any other network node capable of capturing data transfer information associated with a mobile node 110, 112. In an embodiment, accounting nodes 114, 116, 118, 120, and 122 may include PDSNs, GGSNs, HAs, AAA servers, and the like.

In various embodiments an accounting node 114, 116, 118, 120, 122 may include an application server, network service server, and the like. In one embodiment, for example, an accounting node 114, 116, 118, 120, 122 may correspond to a server that facilitates providing streaming media such as news programs, sports programs, and the like. In an embodiment, an accounting node 114, 116, 118, 120, 122 may correspond to a home agent (HA) that facilitates communication within a network such that, for example, users could be billed at a different rate for intra-network communications than they are for inter-network or out-of-network communications. It will be readily appreciated by those skilled in the art that accounting nodes 114, 116, 118, 120, 122 may include a myriad of different types of servers and functionalities, and may operate to provide any number of services, contents, and the like.

As its name implies, AAA server 124 is responsible for authentication, authorization, and accounting associated with users that desire access to network resources available from or through the accounting network 100 or another associated network. It will be appreciated that AAA server 124 may provide all of the authentication, authorization, and accounting services related to accounting network 100, or one or more of these tasks may be divided between two or more AAA servers. It should be understood that, in one embodiment, AAA server 124 may be implemented on a machine that is independent from the machine or machines on which the accounting nodes 114, 116, 118, 120, 122 are implemented, and that in other embodiments, AAA server may be implemented on a common machine with one or more of the accounting nodes 114, 116, 118, 120, 122. Additionally, AAA server 124 may include an accounting node. In other embodiments, authorization and authentication services may be separated from accounting services, the latter of which may be performed on an accounting service node. As used herein, an accounting service node is any network node that may perform accounting services, including, but not limited to, a dedicated accounting service node, an AAA server, and the like. We do not intend, by our illustrations and descriptions herein to limit the functionality, implementation, configuration, or use of AAA server 124, beyond that which is claimed herein.

As shown in FIG. 1, according to an embodiment of the present invention, AAA server 124 includes a unique session identifier (USI) generation module 126, an accounting module 128, an authorization module 130, an authentication module 132, and databases 134, 136. The USI generation module 126 may be capable of generating a USI corresponding to a data session associated with a mobile node 110, 112. In an embodiment, a USI includes an alpha-numeric string generated randomly. The USI may include any number of bits and/or types of characters. Only one USI should be generated for a single data session, thus enabling efficient correlation of information associated with the data session. After generating a USI, AAA server 124 may provide that USI to any one or more of the accounting nodes 114, 116, 118, 120, 122. The accounting nodes 114, 116, 118, 120, 122 may associate any data transfer information that they collect with a USI that corresponds to the session to which the data transfer information is related. In various embodiments, the accounting nodes 114, 116, 118, 120, 122 may use an NAI associated with a mobile node 110, 112 to identify the session to which a particular USI is associated. After a user session has ended, the USI associated therewith may be deleted and flushed from any databases on which it resides.

As used herein, data transfer information includes any of various types of information associated with the transfer of data between a mobile node and an accounting node, whether the mobile node communicates directly with the accounting node, or indirectly such as through another accounting node. In various embodiments, data transfer information may include information associated with data transferred from a mobile node to an accounting node. In other embodiments, data transfer information may include information associated with data transferred from an accounting node (or through an accounting node) to a mobile node. In further embodiments, data transfer information may include information associated with data transferred in both directions. It should be appreciated that the examples and embodiments listed herein are not intended to limit the type of information included within data transfer information, and any combinations of the examples and embodiments listed herein may be considered data transfer information, as well as other examples and embodiments not specifically listed.

In an embodiment, data transfer information may include any number of types of information such as, for example, a number of bytes transferred, a number of packets transferred, the time that a session starts, the time that a session ends, and the duration of a session. Data transfer information may also include specific information regarding destinations or origins of packets of data, types of data included within the payload of packets, and the like. In embodiments, data transfer information may correspond to the headers and/or data contained within packets, destinations, routing, temporal characteristics of a session, various attributes of a user, various attributes of a mobile node, attributes of a network, and/or any other factor about which data can be gathered.

With continuing reference to FIG. 1, the AAA server 124 also includes an accounting module 128. The accounting module 128 may be operable to provide, or facilitate, various accounting practices and procedures within the context of accounting network 100. The functionality provided by the accounting module 128 may include, for example, tracking user consumption of network resources such as services, content, bandwidth, time, and the like. In an embodiment, the accounting module 128 may gather, process, analyze, organize, compile and/or store information associated with user data sessions such as, for example, data transfer information, user attribute information, accounting node performance, and the nature of services used or delivered. In various embodiments, the accounting module 128 may generate accounting records, billing records, or other information useful in management, planning, billing, resource-allocation, and other endeavors related to a communications network.

In one embodiment, the accounting module 128 may generate accounting records that can be used in collecting payment from a user for network services rendered. The accounting module 128 may use any number of accounting and/or billing procedures, policies, rules, algorithms, formulas, charts, and the like in performing accounting tasks. For example, in one embodiment, the accounting module 128 may perform subtractive accounting, in which information representing a total amount of data transferred during a session may be received from an accounting node such as, for example, a PDSN or network access server. The accounting module 128 may also receive data transfer information associated with amounts of data transferred through a particular node or nodes that correspond to various services. Using a subtractive accounting algorithm, the accounting module 128 may then compute an aggregate, or net, amount of recordable data transferred, by subtracting certain amounts of data transfer from the total data transfer amounts. Such subtractions may be based on any number of policies, rules, or rationales.

For example, a mobile network provider may offer a free streaming media service, in which case the amount of data transferred in connection with that service may be subtracted from a total data transfer amount before computing a bill. Payable amounts due may be correlated to various calculations performed within the accounting module 128. Various records, information, and data such as accounting records, billing records, statistical analysis reports, charts, graphs, and the like may also be generated at the accounting module 128 or in connection with some other functionality associated with the accounting module 128.

The AAA server 124 also includes an authorization module 130 and an authentication module 132. These modules provide functionality for authorization and authentication procedures, both of which are well-known in the art, and will not be described in detail here. However, it should be recognized that the authorization module 130 and authentication module 132 may be modified in various ways to accommodate implementation of embodiments of the present invention.

Thus, in an embodiment of the present invention, authorization module 130 and authentication module 132 may both be configured to communicate with the USI generation module 126. In this way, the USI generation module 126 may be configured to generate a USI upon receipt of a particular communication from one or both of the authorization module 130 and the authentication module 132. Additionally, the USI generation module 126 may communicate a USI to one or both of the authorization module 130 and the authentication module 132 for various purposes. It will be recognized that various other modifications and configurations may be desired in connection with implementation of the present invention.

As shown in FIG. 1, the AAA Server 124 includes databases 134, 136. It will be appreciated that the illustration of two databases herein is made for simplicity and clarity, and is not meant to limit the number or functionality of databases related to implementation of various embodiments of the present invention. Thus, for example, an AAA server 124 may include a single database or, in other embodiments, may include large numbers of databases. Additionally, any one of the other elements illustrated in FIG. 1 (i.e., the mobile nodes 110, 112, and the accounting nodes 114, 116, 118, 120, 122) may contain one or more databases. In another embodiment, the accounting network 100 may contain a separate node that includes one or more databases, a bank of databases, or a database cluster.

Databases 134, 136 may be used for storing any number of types of data and/or information. In an embodiment, a database 134, 136 may be a session state database used for temporary storage of a USI associated with an ongoing session. At the end of the session, the session state database 134, 136 may be flushed, deleting the USI associated with the completed session. In another embodiment, a database 134, 136 may be used for temporary or permanent storage of any number of types of information such as, for example, USI's, user profiles (e.g., attributes, demographic data, and the like), configuration settings related to mobile nodes, data transfer information, accounting records, billing records, and the like.

As used herein, accounting records may be any records that include any kind of data associated with any functions such as accounting, statistical, analytical, billing, monitoring, collecting, and compiling functions. In an embodiment, an accounting record may include information relating to a particular user, mobile node, session, accounting node, etc. In one embodiment, for example, an accounting record may include, among other things, data transfer information related to a specific data session, mobile node, or user.

In an embodiment of the present invention, accounting records may include billing records, which may be produced for purposes of charging a client for services. A billing record may include data transfer information associated with a particular session, mobile node, accounting node, user, network, and the like. For example, a billing record may contain information such as a USI, an identification of a corresponding mobile node, information related to the total amount of data transferred, information related to data transferred between or through particular network nodes, calculations of aggregate data throughputs, information related to subtractive billing methods such as those that may be applied by accounting module 128, and other information useful in monitoring, tracking, billing, and otherwise managing communications to and from a mobile node 110, 112

Some of the aforementioned components may be implemented in hardware, software, or a combination of the same. They may be composed of several constituent components. Moreover, others may attribute different names to the same components. Thus, descriptive adjectives have been provided that indicate the functions that these various components carry out. Additional explanations of the same follow.

Figure 2:
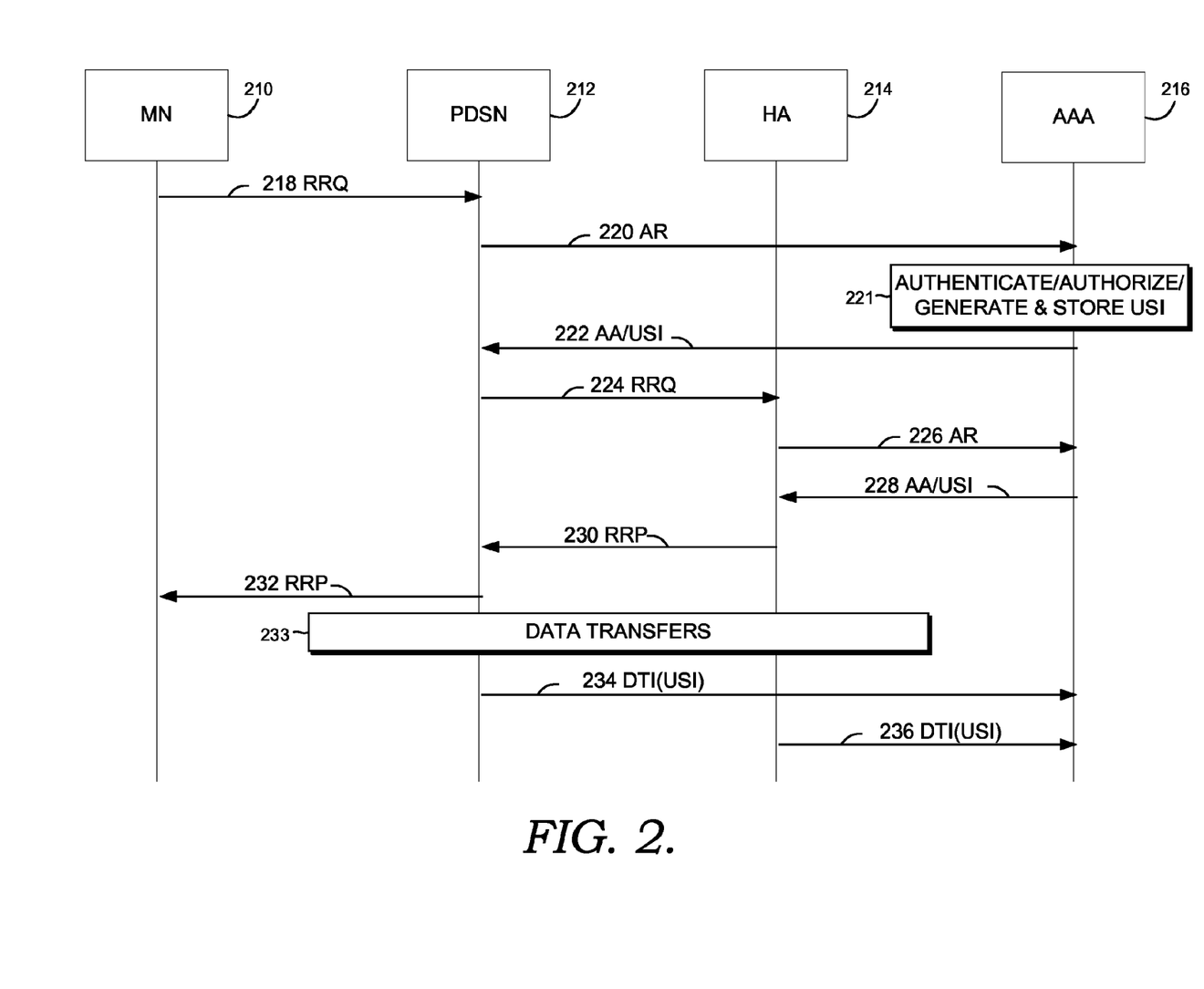
FIG. 2 is a schematic diagram illustrating an exemplary communication flow in accordance with an embodiment of the present invention.

Turning now to FIG. 2, a schematic diagram illustrating an exemplary communication flow in accordance with an embodiment of the present invention is shown. The exemplary accounting network depicted in the embodiment illustrated in FIG. 2 includes a mobile node (MN) 210, a packet data serving node (PDSN) 212, a home agent (HA) 214, and an AAA server 216. In an embodiment such as the example illustrated in FIG. 2, HA 214 may include a network node associated with providing a particular type of service such as, for example, multimedia content, intra-network communications, or the like. In an embodiment depicted in FIG. 2, the HA 214 collects data transfer information related to a service for which a user of mobile node 210 should not be charged. In contrast, the PDSN 212 collects data transfer information associated with any and all transfers of data between the MN 210 and any of the other elements of the accounting network illustrated in FIG. 2, i.e., the PDSN 212, the HA 214, and the AAA 216. In an embodiment, the MN 210 may communicate with other network elements, other MN's, or other networks via the PDSN 212. That is, all of the data that is transferred to or from the MN 210 may pass through the PDSN 212. In this way, the PDSN 212 can collect information associated with all of the data transfers to and from MN 210.

As shown at 218, a registration request (RRQ) is communicated from the MN 210 to the PDSN 212. In an embodiment, the RRQ 218 includes a request to initiate a data session on the network during which the MN 210 may access various network resources. In the example depicted in FIG. 2, the RRQ 218 includes a request to access network resources available from the HA 214. In addition to a request for various resources, the RRQ 218 may include various types of information such as a user name associated with a user of the MN 210, an NAI, a password, location information, a certificate, and/or any other type of information useful in facilitating initiation of a session, accounting, monitoring, and the like.

In response to receiving the RRQ 218, the PDSN 212 communicates an access request (AR) 220 to the AAA server 216. The AR 220 may contain part or all of the information communicated with the RRQ 218. The AR 220 may also include a request for authentication associated with the MN 210, a request for authorization for the MN 210 to access network resources available from the PDSN 212, and any other desirable types of requests or information. After receiving the AR 220, the AAA server 216 performs various authentication and authorization procedures, as shown at 221, some or all of which may utilize information passed in the AR 220. Additionally, as further indicated at 221, the AAA server 216 generates a unique session identifier (USI), which it stores in a database at the AAA server 216. Assuming that the authorization and authentication procedures indicate that the MN 210 is a verified entity authorized to access various network resources, the AAA server 216 communicates an access accept which includes the USI (AA/USI) 222 to the PDSN 212. Upon receiving the AA/USI 222, the PDSN 212 may grant the MN 210 access to one or more network resources as defined in the AA/USI 222.

With continuing reference to FIG. 2, the user of the MN 210 may wish to access network resources available from the HA 214. To do so, the MN 210 communicates through the PDSN 212, causing the PDSN 212 to communicate an RRQ 224 to the HA 214. In response, the HA 214 communicates an AR 226 to the AAA server 216. Although not illustrated in FIG. 2, the AAA server 216 performs an authorization and authentication procedure in response to the AR 226. Assuming that authorization is granted, the AAA server 216 communicates an AA/USI 228 to the HA 214.

The AA/USI 228 includes an authorization to grant the MN 210 access to network resources available from the HA 214. Additionally, the AA/USI 228 includes the same USI generated by the AAA server at 221. In this way, all of the accounting nodes (i.e., the PDSN 212, and the HA 214) in the network have the same USI that is associated with data transfer information that they may collect in relation to the data session corresponding to the MN 210. As shown at 230, the HA 214 communicates a registration reply (RRP) to the PDSN 212, which communicates a corresponding RRP 232 to the MN 210. The RRP 232 includes authorization for the MN 210 to access network resources, as defined in the RRP 232.

Once the MN 210 is granted access to network resources, in accordance with the specifics of the RRP 232, the MN 210 may send and receive data in a series of data transfers 233 between the MN 210 and the network. In the example of FIG. 2, all of the data transfers 233 are communicated through the PDSN 212, which collects data transfer information corresponding to all of the data transfers 233. A portion of the data transfers 233 may be directed to, or through, the HA 214, and the HA 214 collects data transfer information regarding any of those transfers that correspond to a recordable data transfer type. The PDSN 212 and the HA 214 associate collected data transfer information that corresponds to the session with the USI.

After the session is terminated (or upon termination), the PDSN 212 communicates the data transfer information (DTI) that is associated with the USI, indicated as DTI(USI) in FIG. 2, to the AAA server 216, as shown at 234. Additionally, the HA 214 communicates the DTI it collected DTI(USI) 236 to the AAA server 216. Although not illustrated in FIG. 2, the AAA server may then perform various accounting functions using the two sets of data transfer information, DTI(USI) 234 and DTI(USI) 236. The AAA server 216 may also compile any other data related to the session by utilizing the single USI for correlating information.

Figure 3:
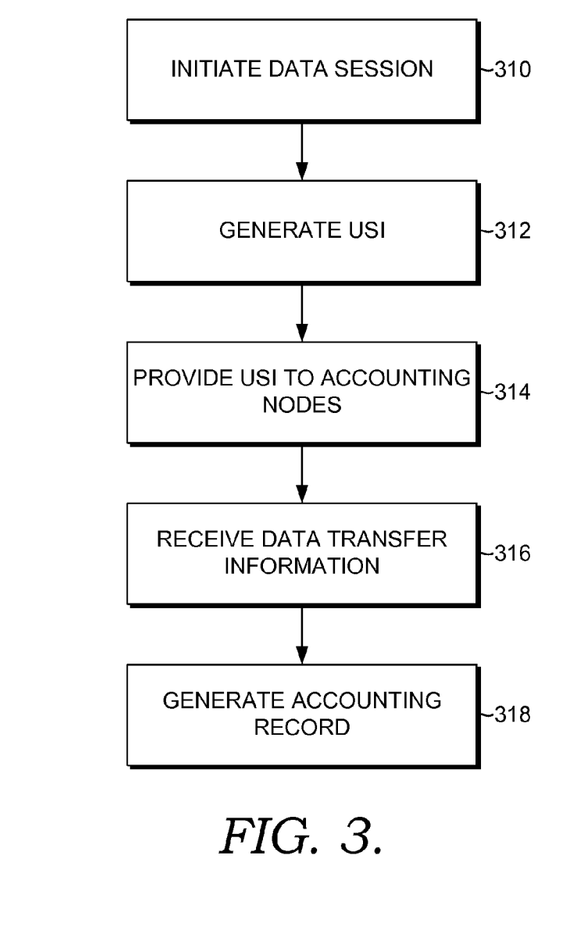
FIG. 3 is a flow diagram illustrating an exemplary method of accounting for data transfer across a packet-switched network in accordance with an embodiment of the present invention.

To recapitulate, we have described an aspect of the invention that relates to performing a method of accounting for data transfer across a packet-switched network. With reference to FIG. 3, one embodiment of this method includes, at a step 310, initiating a data session for a user on a packet-switched mobile communications network. In an embodiment, the network includes one or more accounting nodes that report data transfer information to an accounting service node such as, for example, an AAA server. At a step 312, a unique session identifier (USI) is generated. In an embodiment, the accounting service node may first check to see if a USI has already been generated for the session. The USI is associated with the session initiated at step 310.

At a step 314, the USI is provided to each of the one or more accounting nodes in the network. The accounting service node receives data transfer information at a step 316. The data transfer information received at step 316 corresponds to the data session, and is reported by the accounting nodes. The data transfer information is also associated with the USI by the accounting nodes so that after it is received by an accounting service node, it can be compiled, using the USI, with other data transfer information corresponding to the same session such as, for example, information received from other nodes. In a final illustrative step 318, an accounting record is generated based on the compiled data transfer information.

Figure 4:
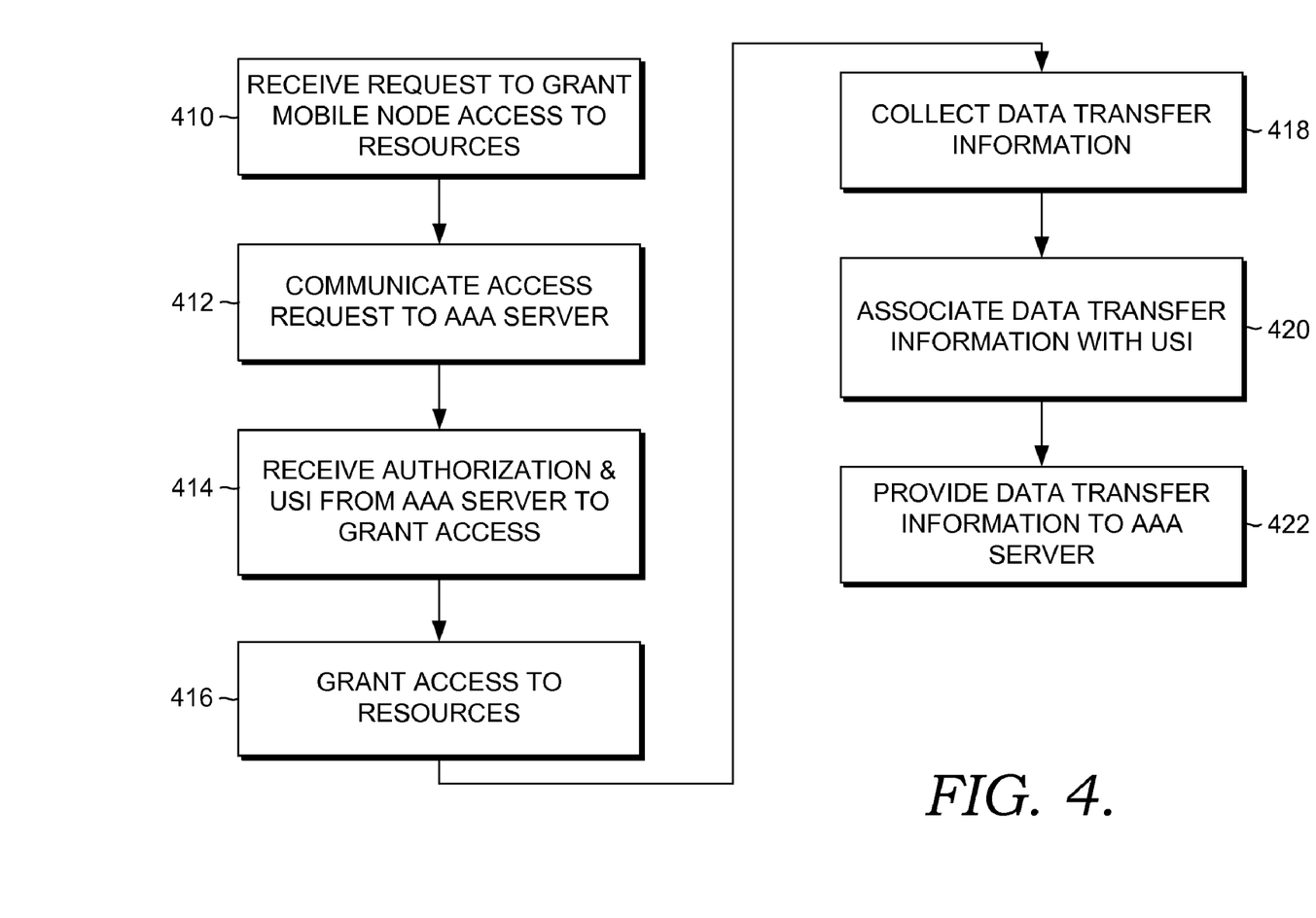
FIG. 4 is a flow diagram illustrating an exemplary method of accounting for data transfer across a packet-switched network in accordance with an embodiment of the present invention.

With reference to FIG. 4, another embodiment of the invention is provided that includes, at a step 410, receiving a request to grant a mobile node access to resources on a packet-switched mobile communications network. At a step 412, an access request is communicated to an AAA server. In an embodiment, the access request may include a request for authentication associated with the mobile node. In another embodiment, the access request may include a request for authorization to access one or more network resources. In a further embodiment, the access request may include both an authentication and an authorization request.

At a step 414, authorization to grant the mobile node access to one or more network resources is received from the AAA server. The authorization received at step 414 includes a USI associated with the session. In response to the authorization, at a step 416, the mobile node is granted access to network resources. At a step 418, as the mobile node sends and receives data, data transfer information associated with communications between the mobile node and the network is collected. The collected data transfer information is associated with the USI, as shown at step 420. In a final illustrative step 422, the collected data transfer information is provided to the AAA server.

Figure 5:
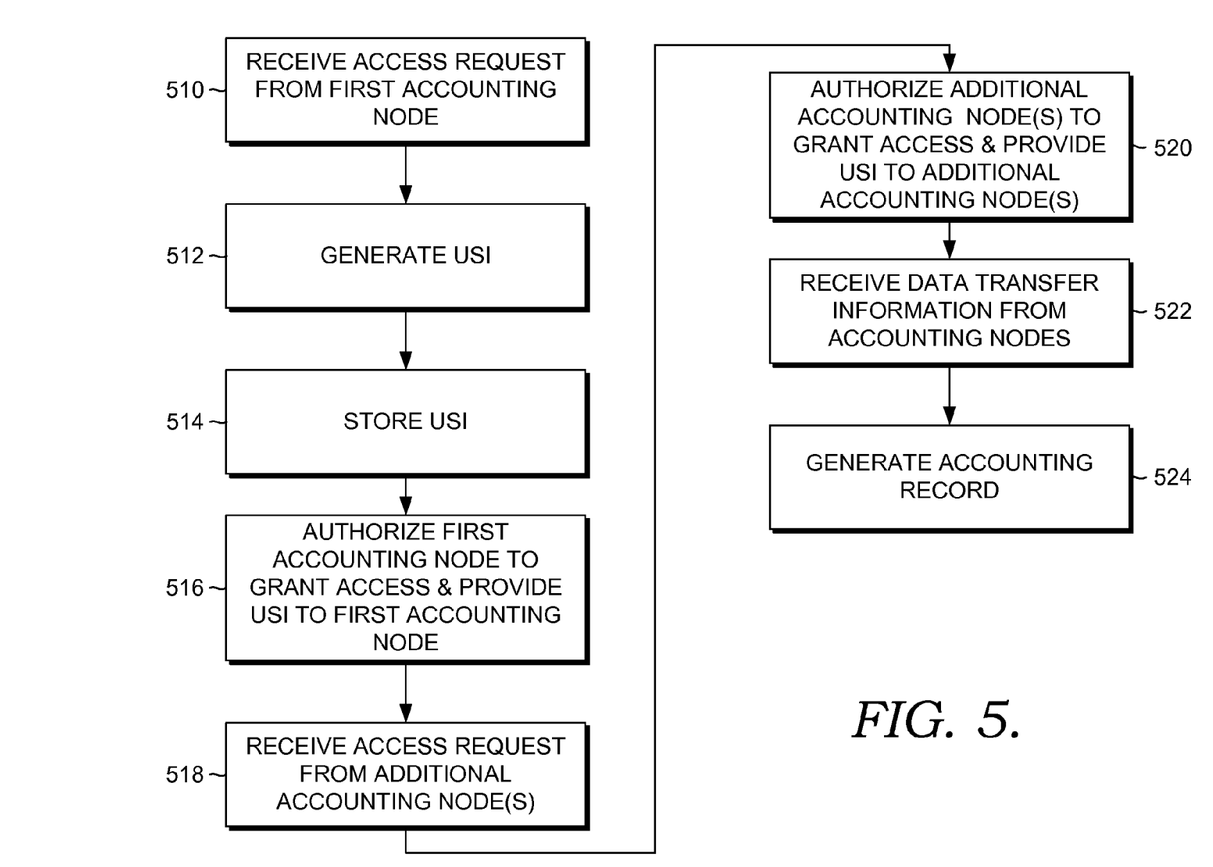
FIG. 5 is a flow diagram illustrating an exemplary method of accounting for data transfer across a packet-switched network in accordance with an embodiment of the present invention.

With reference to FIG. 5, another embodiment of the present invention is provided that includes, at a step 510, receiving an access request from a first accounting node. The access request may include, in an embodiment, a request to authorize the first accounting node to grant a user access to one or more network resources available from the first accounting node. In an embodiment, the access request may comprise a request to initiate a session.

At a step 512, a USI associated with the session is generated. The USI is stored in a database, as shown at step 514. At a step 516, the first accounting node is authorized to grant the user access. The authorization includes providing the first accounting node with the USI. At a step 518, access requests are received from additional accounting nodes. In an embodiment, one access request is received from one additional accounting node. In other embodiments, a plurality of access requests are received from a plurality of additional accounting nodes. In an embodiment, access requests received at step 518 include requests to authorize the additional accounting node or nodes to grant the user access to one or more network resources.

At a step 520, the additional accounting node or nodes are granted access to the requested network resources. Additionally, at step 520, the additional accounting nodes are provided with the USI corresponding to the user session. At a step 522, data transfer information corresponding to the USI is received from the first accounting node, as well as any additional accounting nodes. In a final illustrative step, step 524, an accounting record corresponding to the session is generated based on the data transfer information.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-useable instructions embodied thereon for performing a method of accounting for data transfer across a packet-switched network, the method comprising:

initiating a data session for a user on a packet-switched mobile communications network, wherein the network comprises one or more accounting nodes that report data transfer information to an accounting service node;

generating a unique session identifier associated with the data session;

providing the unique session identifier to each of the one or more accounting nodes;
simultaneously receiving data transfer information from each of the one or more accounting nodes, the data transfer information being associated with the unique session identifier;
correlating the data transfer information from each of the one or more accounting nodes using the unique session identifier; and
generating an accounting record for the data session based on the correlated data transfer information.

2. The media of claim 1, wherein the data session comprises a session during which a user transmits and receives data packets over the network.

3. The media of claim 1, wherein the packet-switched mobile communications network comprises a CDMA mobile network.

4. The media of claim 3, wherein the CDMA mobile network utilizes a remote authentication dial in user service (RADIUS) protocol.

5. The media of claim 3, wherein at least one of the one or more accounting nodes comprises a packet data serving node (PDSN).

6. The media of claim 5, wherein the data transfer information reported by at least one accounting node comprises a subset of data transfer information reported by the PDSN.

7. The media of claim 6, wherein the at least one accounting node comprises an application server.

8. The media of claim 1, wherein the unique session identifier is generated by an accounting node.

9. The media of claim 8, wherein the accounting node comprises an Authorization, Authentication, and Accounting (AAA) server.

10. One or more non-transitory computer-readable media having computer-useable instructions embodied thereon for performing a method of accounting for data transfer across a packet-switched network, the method comprising:
a first accounting node:
(A) receiving a request to grant a mobile node access to at least one second accounting node on a packet-switched mobile network;
(B) communicating an access request to an Authorization, Authentication, and Accounting (AAA) server, wherein the access request comprises a request for authentication of the mobile node;
(C) receiving authorization from the AAA server to grant the mobile node access to the at least one second accounting node associated with the network, wherein the authorization comprises a unique session identifier;
(D) receiving data transfer information associated with communications between the mobile node and the at least one second accounting node;
associating the data transfer information received from the at least one second accounting node with the unique session identifier; and
providing the collected data transfer information with the unique session identifier to the AAA server.

11. The media of claim 10, wherein the request is received from an accounting node that receives communications from the mobile node.

12. The media of claim 11, wherein the accounting node comprises a PDSN.

13. The media of claim 10, wherein the unique session identifier comprises a randomly generated alpha-numeric string.

14. The media of claim 10, further comprising performing filtered deep packet capturing to capture packets corresponding to one or more sets of recordable transfer types.

15. The media of claim 14, wherein collecting data transfer information comprises performing deep packet inspection on the captured packets to identify one or more recordable data transfers.

16. The media of claim 10, wherein the network comprises a CDMA network utilizing a RADIUS protocol.

17. One or more non-transitory computer-readable media having computer-useable instructions embodied thereon for performing a method of accounting for data transfer across a packet-switched network, the method comprising:
receiving a request to authorize a first accounting node to grant a user access to one or more network resources available from said first accounting node, wherein said request comprises a request to initiate a session;
generating a unique session identifier associated with the session;
storing the unique session identifier in a database;
authorizing the first accounting node to grant the user access, wherein said authorizing comprises providing the unique session identifier to the first accounting node;
receiving a request to authorize at least one second accounting node to grant the user access to one or more network resources available from said at least one second accounting node;
authorizing the at least one second accounting node to grant the user access, wherein said authorizing comprises providing the unique session identifier to the at least one second accounting node;
simultaneously receiving data transfer information corresponding to the unique session identifier from the first accounting node and the at least one second accounting node;
correlating the data transfer information from the first accounting node and the at least one second accounting node using the unique session identifier; and
generating an accounting record corresponding to the session based on the correlated data transfer information.

18. The media of claim 17, wherein the accounting record comprises a billing record.

19. The media of claim 18, wherein generating an accounting record comprises:
compiling all received data transfer information associated with the unique session identifier;
performing subtractive accounting to identify a net recordable data transfer quantity; and
identifying a payable amount that corresponds to the net recordable data transfer quantity.

20. The media of claim 17, wherein the accounting record includes information indicating one or more attributes associated with the session.

* * * * *